(12) United States Patent
Qureshi et al.

(10) Patent No.: US 9,148,438 B2
(45) Date of Patent: Sep. 29, 2015

(54) SYSTEM, METHOD AND COMPUTER PROGRAM PRODUCT FOR PUBLISHING NON-MALICIOUS THIRD PARTY CONTENT TO A DATA FEED

(71) Applicant: salesforce.com, inc., San Francisco, CA (US)

(72) Inventors: Shozub Qureshi, Bellevue, WA (US); Man Lung Hui, Seattle, WA (US); Carter Thaxton, Portland, OR (US)

(73) Assignee: salesforce.com, inc., San Francisco, CA (US)

( * ) Notice: Subject to any disclaimer, the term of this patent is extended or adjusted under 35 U.S.C. 154(b) by 79 days.

(21) Appl. No.: 13/888,294

(22) Filed: May 6, 2013

(65) Prior Publication Data

US 2013/0347061 A1    Dec. 26, 2013

Related U.S. Application Data (60) Provisional application No. 61/663,714, filed on Jun. 25, 2012.

(51) Int. Cl.
*G06F 21/50* (2013.01)
*H04L 29/06* (2006.01)

(52) U.S. Cl.
CPC ............ *H04L 63/14* (2013.01); *H04L 63/10* (2013.01); *H04L 63/1416* (2013.01); *G06F 21/50* (2013.01); *H04L 63/0227* (2013.01)

(58) Field of Classification Search
CPC ....................................................... G06F 21/50

USPC ........................................................... 726/22
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |

(Continued)

*Primary Examiner* — Jacob Lipman
(74) *Attorney, Agent, or Firm* — Zilka-Kotab, PC (57) ABSTRACT

In accordance with embodiments, there are provided mechanisms and methods for publishing non-malicious third party content to a data feed. These mechanisms and methods for publishing non-malicious third party content to a data feed can provide analysis of third party content requested to be published to a data feed, which can be used to safeguard against the publication of malicious content to the data feed.

12 Claims, 5 Drawing Sheets

(56) References Cited

U.S. PATENT DOCUMENTS

| | | |
|---|---|---|
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,620,655 B2 | 11/2009 | Larsson et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0290405 A1* | 11/2012 | Talluri ............... 705/14.69 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |

* cited by examiner

FIGURE 5

# SYSTEM, METHOD AND COMPUTER PROGRAM PRODUCT FOR PUBLISHING NON-MALICIOUS THIRD PARTY CONTENT TO A DATA FEED

CLAIM OF PRIORITY

This application claims the benefit of U.S. Provisional Patent Application No. 61/663,714 entitled "System and Method for Sanitizing Data Published to a Feed," by Qureshi et al., filed Jun. 25, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data feeds, and more particularly content published to data feeds.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Data feeds have conventionally been used as a mechanism to provide content to users that access the data feed. For example, content may be posted to the data feed by users, content providers, etc. In turn, the posted content may be displayed to users viewing the data feed. In many instances, content that is posted to the data feed is external to a provider of the data feed (e.g. is stored by a third party, etc.), which unfortunately can endanger the security of the data feed when the content posted to the data feed is malicious.

Accordingly, it is desirable to provide techniques that safeguard against the publication of malicious content to a data feed.

BRIEF SUMMARY

In accordance with embodiments, there are provided mechanisms and methods for publishing non-malicious third party content to a data feed. These mechanisms and methods for publishing non-malicious third party content to a data feed can enable embodiments to provide analysis of third party content requested to be published to a data feed, which can be used to safeguard against the publication of malicious content to the data feed.

In an embodiment and by way of example, a method for publishing non-malicious third party content to a data feed is provided. In use, content is identified, where the content is stored by a first entity and is to be published by a data feed provided as a service by a second entity. Additionally, it is determined by the second entity whether the content is at least potentially malicious, utilizing at least one predefined rule. Further, access to the content via the data feed is conditionally allowed, based on the determination of whether the content is at least potentially malicious.

While one or more implementations and techniques are described with reference to an embodiment in which the publication of non-malicious third party content to a data feed is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are pr vided for publishing non-malicious third party content to a data feed.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing publishing non-malicious third party content to a data feed will be described with reference to example embodiments.

Figure 1:
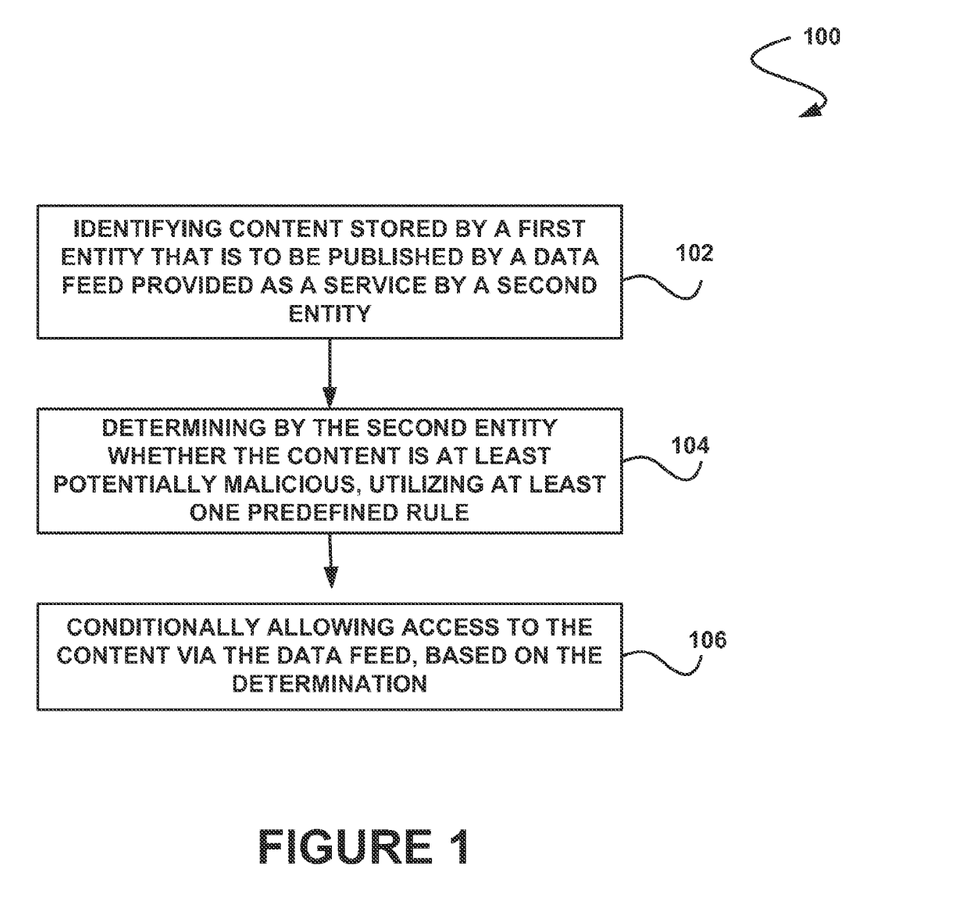
FIG. 1 illustrates a method for publishing non-malicious third party content to a data feed, in accordance with an embodiment.

FIG. 1 illustrates a method 100 for publishing non-malicious third party content to a data feed, in accordance with an embodiment. As shown in operation 102, content is identified, where the content is stored by a first entity and is to be published by a data feed provided as a service by a second entity. In the context of the present description, the data feed is any structured service to which content may be posted by one or more entities for publication to one or more other entities. For example, content posted to the data feed by a user, application, etc. may be published (i.e. displayed, presented, etc.) in a preconfigured manner to a user accessing (e.g. viewing, etc.) the data feed. In this way, the data feed may potentially publish content from multiple different content sources for the consumption by any number of users. Examples of the data feed may be a web feed, news feed, Rich Site Summary (RSS) feed, product feed, etc.

As described above, the content to be published by the data feed is stored by a first entity. The first entity may be any entity that is capable of storing content and that is external to the second entity providing the data feed as a service. Thus, the first entity may be a third party server of a content provider having memory for storing the content. For example, the first entity may be a website (e.g. YouTube.com, Vimeo, Spotify, etc.), a mobile application website (e.g. Google™ Apps), a website for creating content, etc. As another option, the first entity may be a user device, having memory for storing the content. Just by way of example, the first entity may be a user device storing content via an application of the user device (e.g. Microsoft Office™, iTunes, etc.).

Similarly, the second entity providing the data feed may be any entity that is separate from the first entity and that provides the structured data feed service mentioned above. For example, the second entity may be one or more servers of a provider of the data feed service. In one embodiment, the provider of the data feed service may be a multi-tenant on-demand database system, where for example the data feed service is accessible to tenants of the multi-tenant on-demand database system.

It should be noted that the identified content that is stored by the first entity and that is to be published by the data feed may be any type of content that is capable of being published by the data feed. Just by way of example, content may be media (e.g. audio, video, etc.), a data file, an image, text, a folder, an archive, a data object, etc.

Further, the content may be identified in any manner that is associated with publication of the content to the data feed. In one embodiment, the content may be identified from a request for the content to be posted to the data feed. Such a request may be received from the first entity storing the content, from a user via a user device separate from the first entity storing the content, from an application executing on a device separate from the first entity storing the content, etc. In another embodiment, the content may be identified in response to a user request to access (e.g. view, etc.) a portion of the data feed to which the content has already been posted (e.g. by another user, application, content provider, etc.).

As shown in operation 104, it is determined by the second entity whether the content is at least potentially malicious, utilizing at least one predefined rule. With respect to the present description, the content may be at least potentially malicious if the content is determined to be at least potentially unwanted, in accordance with the one or more predefined rules. Just by way of example, the content may be potentially malicious if the content itself at least potentially includes malicious code (e.g. spam, malware, etc.) and/or if the content is susceptible to being infiltrated with malicious code.

In one embodiment, the content may be requested to be posted to the data feed by sending to the data feed a link to the content. For example, the link may be a uniform resource locator (URL) that references the content at the first entity. Such a link may be utilized, for example, so that the second entity providing the data feed does not necessarily store a copy of the content for publishing the same to the data feed, but instead so that an entity (e.g. user device) accessing the data feed to consume content published thereon automatically retrieves the content directly from the first entity via the link.

Accordingly, the one or more predefined rules used to determine whether the content is at least potentially malicious may be applied to the link. As an option, the predefined rule may indicate that a relative URL that references the content cannot allow cross-site request forgery (CSRF) attacks. As another option, the predefined rule may indicate that a URL referencing the content cannot contain a domain name predetermined to be associated with potentially malicious content (i.e. blacklisted).

In another embodiment, the content may be requested to be posted to the data feed by uploading the content from the first entity to the second entity, or the content may be downloaded to a secure environment (e.g. of the second entity) via the aforementioned link. In this way, the one or more predefined rules may be applied to the content itself for determining whether the content is at least potentially malicious. As an option, the predefined rule may indicate that only certain content types (e.g. file types, image types, etc.) may be published by the data feed. As another option, the predefined rule may indicate that certain hypertext transfer model language (HTML), such as that relating to double escaping, is not permitted to be included in the content, which may be determined from the innerHTML of the document object model (DOM) of the content.

While various examples of rules have been described above, it should be noted that any predefined rules may be configured that analyze the content itself or any aspect associated with the content (e.g. a source of the content, a link to the content, etc.) for determining whether the content is at least potentially malicious. As shown in operation 106, access to the content via the data feed is then conditionally allowed, based on the determination of whether the content is at least potentially malicious. In the present embodiment, the access to the content may refer to the viewing or other consumption of the content via the data feed. For example, the content may be conditionally published via the data feed (and thus accessible to users accessing the data feed), based on the determination of whether the content is at least potentially malicious.

In one embodiment, access to the content via the data feed may be allowed when it is determined that the content is not at least potentially malicious. For example, the access may be provided by publishing the content to the data feed. In this way, users accessing (e.g. viewing) the data feed may access the published content.

In another embodiment, access to the content via the data feed may be prevented when it is determined that the content is at least potentially malicious. For example, the access may be prevented by denying publication of the content to the data feed. As another example, access to the content via the data feed may be prevented by first cleaning the content to create a clean version of the content that is not at least potentially malicious, and then publishing the cleaned version of the content to the data feed. Various example of cleaning the content will be described with reference to the subsequent figures below. To this end, users accessing (e.g. viewing) the data feed may be prevented from accessing the content that has been determined to be at least potentially malicious.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
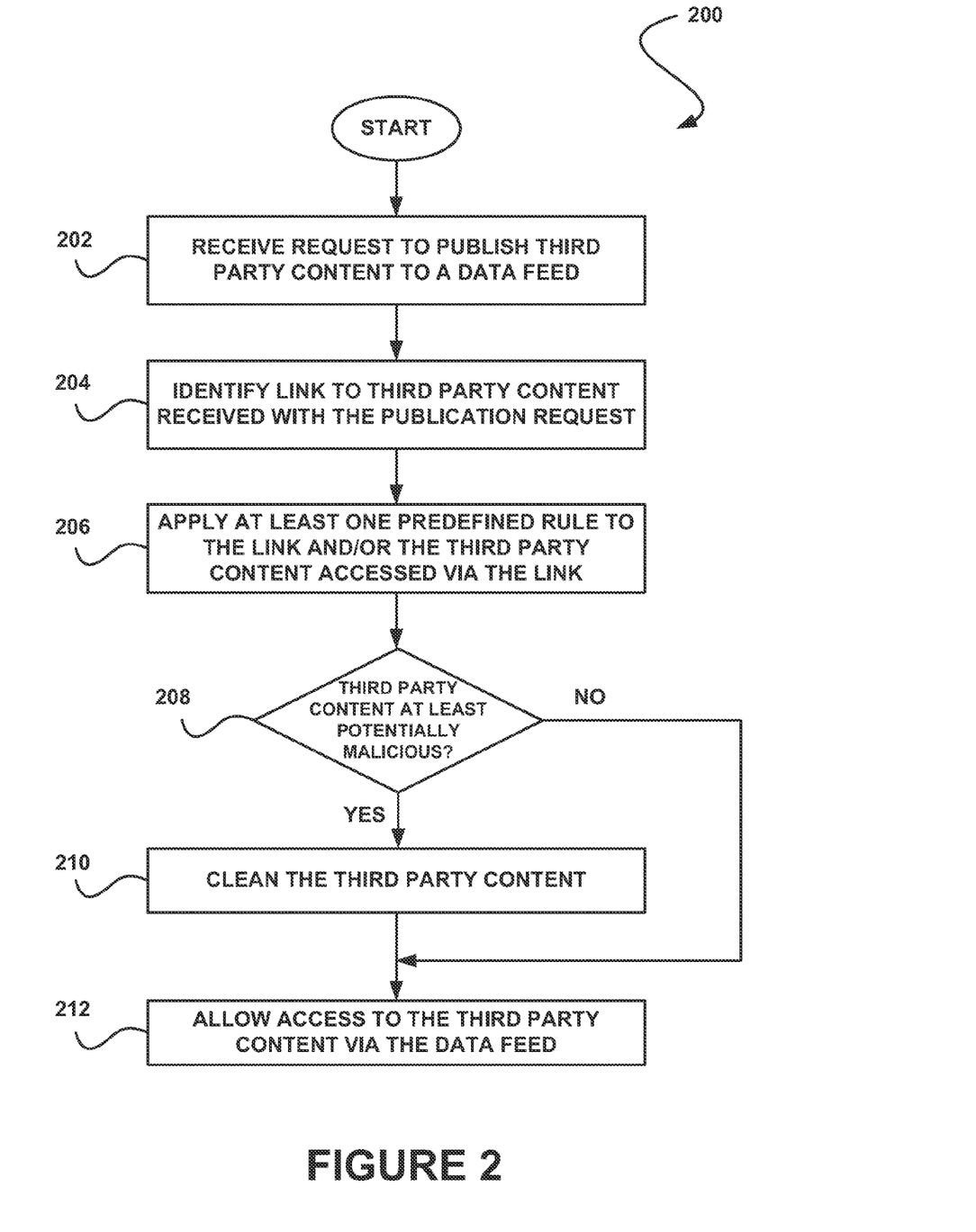
FIG. 2 illustrates a method for ensuring third party content to a data feed is non-malicious, in accordance with an embodiment.

FIG. 2 illustrates a method 200 for ensuring third party content to a data feed is non-malicious, in accordance with an embodiment. As an option, the method 200 may be carried out in the context of the method 100 of FIG. 1. For example, the method 200 may be carried out by the provider of the data feed service. Of course, however, the method 200 may be carried out in any desired environment. It should also be noted that the aforementioned definitions may apply during the present description.

As shown in operation 202, a request to publish third party content to a data feed is received. The third party content may be any content stored by a third party that is separate from a provider of the data feed. Thus, the content may or may not be created by the third party, but in any case is stored in memory of a device of the third party.

It should be noted that the request to publish the third party content to the data feed may be received from a user or application that is part of the third party, or from any user or application that is separate from the third party. Just by way of example, a user of an end user device may request to publish to the data feed a video from the third party website YouTube.com that is stored on a YouTube.com server. As another example, a use of an end user device may request to publish to the data feed content that stored on the end user device.

Additionally, as shown in operation 204, a link to the third party content received with the publication request is identified. Thus, the request received in operation 202 may include the link to the third party content stored in the memory of the third party. Such link may be a URL that references the third party content in the memory of the third party.

Further, at least one predefined rule is applied to the link and/or the third party content accessed via the link. Note operation 206. In the context of the present embodiment, the predefined rules may be configured for determining whether the third party content is at least potentially malicious. Thus, each predefined rule may include a condition, which when met, indicates that the third party content is/is not at least potentially malicious. For example, one or more predefined rules may be configured for analyzing one or more aspects of the link. Those rules may accordingly be applied to the link for determining whether the link is indicative of the third party content being at least potentially malicious.

As another example, one or more predefined rules may be configured for analyzing one or more aspects of the third party content. Thus, the third party content may be downloaded (e.g. to a secure environment, such as a server, etc.) using the link, and those predefined rules may then be applied to the downloaded third party content for determining whether the third party content is at least potentially malicious.

While operation 206 is shown as responsive, in part, to operation 202 in which the request to publish the third party content to the data feed is received, it should be noted that the application of the predefined rules to the link and/or the third party content may not necessarily be performed automatically in response to the receipt of the publication request. As another option, operation 206 may be performed in response to a user requesting access to the data feed for consuming content published therein.

In decision 208 it is determined whether the third party content is at least potentially malicious. As noted above, the determination is based on the application of the predefined rules to the link and/or the third party content. If it is determined that the third party content is not at least potentially malicious, access to the third party content via the data feed is allowed. Note operation 212. For example, the third party content may be made accessible to users accessing the data feed by publishing the third party content to the data feed. As another example, the third party content may be made accessible to users accessing the data feed by publishing the link to the data feed, such that upon a device of a user accessing the data feed, the device of the user may automatically access the link to download, stream, etc. the third party content to the device of the user.

However, if it is determined in decision 208 that the third party content is at least potentially malicious, the third party content is cleaned. Note operation 210. In one embodiment, the third party content may be cleaned by removing a particular portion of the third party content determined to be at least potentially malicious, changing an aspect of the third party content determined to cause the third party content to be at least potentially malicious, or any other action that removes the potentially malicious nature of the third party content.

Just by way of example, for third party content that includes a script indicated by one of the predefined rules to be at least potentially malicious, the third party content may be cleaned by removing the script from the third party content. As another example, for third party content that includes data of a Rich type indicated by one of the predefined rules to be at least potentially malicious, the third party content may be cleaned by removing the data of the Rich type from the third party content.

Optionally, a potentially malicious portion of the third party content may be removed, and a copy of the cleaned third party content saved to memory (e.g. of the provider of the data feed). In the data feed, a link to that cleaned third party content may then replace the link to the third party content stored in the memory of the third party. As another option, a potentially malicious portion of the third party content may be removed during rendering of the third party content to a device of the user accessing the data feed by preventing rendering of that potentially malicious portion of the third party content. Once the third party content is cleaned to remove any portions determined to be at least potentially malicious, access to the third party content via the data feed is allowed (operation 212), for example as described above.

Figure 3:
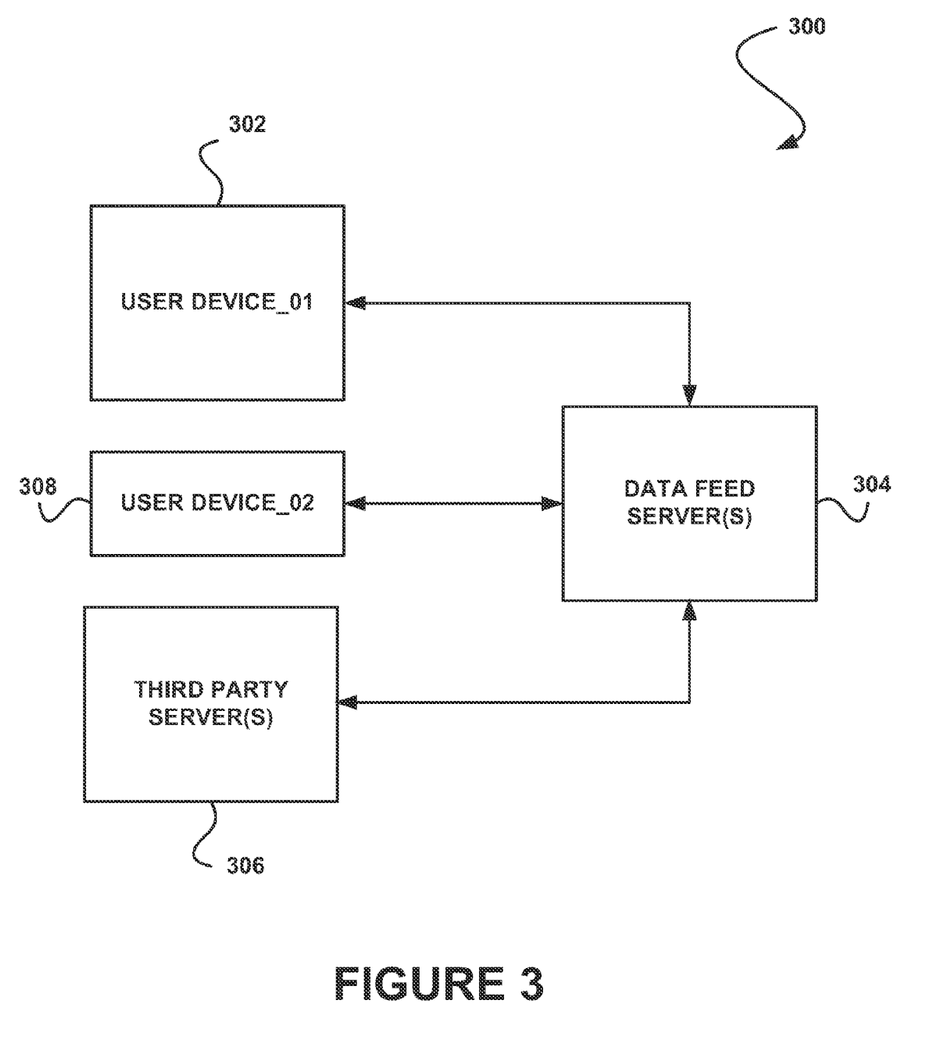
FIG. 3 illustrates a system for publishing non-malicious third party content to a data feed, in accordance with an embodiment.

FIG. 3 illustrates a system 300 for publishing non-malicious third party content to a data feed, in accordance with an embodiment; As an option, the system 300 may be implemented to carry out the methods 100, 200 of FIGS. 1 and/or 2 respectively. Of course, however, the system 300 may be implemented in any desired environment. It should also be noted that the aforementioned definitions may apply during the present description.

It should be noted that each of the various connections shown between the components (e.g. servers, devices, etc.) of the present system 300 may be established over wired or wireless network, a direct connection, etc. Further, each component of the present system 300 may include memory, one or more processors, and/or any other circuitry for implementing the operations described below.

As shown, a first user device 302 communicates with one or more data feed servers 304 to request that content stored by a third party server 306 be posted to a data feed provided as a service by the one or more data feed servers 304. The request may include a link to the content stored by the third party server 306.

Upon receipt of the request, the one or more data feed servers 304 store the link to the content for use in determining whether the content is at least potentially malicious. Such a determination may be made once the link is stored by the one or more data feed servers 304, or may be made when a second user device 308 subsequently requests to access the data feed. In any case, the one or more data feed servers 304 use one or more predefined rules to determine whether the content is at least potentially malicious.

In one embodiment, the data feed servers 304 may apply one or more of the predefined rules to the link to determine whether the content is at least potentially malicious. In another embodiment, the data feed servers 304 may use the link to download the content to a secure environment of the data feed servers 304, and may then apply one or more of the predefined rules to the downloaded content. Optionally, the data feed servers 304 may store the predefined rules and may execute code (e.g. Javascript) to apply the predefined rules in the manner noted above.

If it is determined from the predefined rules that the content is not at least potentially malicious, the content is published to the data feed for allowing the second user 308 to access the content via the data feed. If, however, it is determined from the predefined rules that the content is at least potentially malicious, the content is prevented from being published to the data feed for preventing the second user 308 from accessing the content via the data feed. As an option, the content determined to be at least potentially malicious may be cleaned and then the cleaned version of the content made accessible to the second user 308 via the data feed.

While only a single user device 308 is described above as accessing the data feed for consumption of content published therein, it should be noted that any number of different user devices may similarly access the data feed. Further, while only a single user device 302 is described above as requesting to post content of a single third party server 306 to the one or more data feed servers 304, it should be noted that any number of different user devices may similarly request to post content of any number of different third party servers to the one or more data feed servers 304 providing the data feed service.

System Overview

Figure 4:
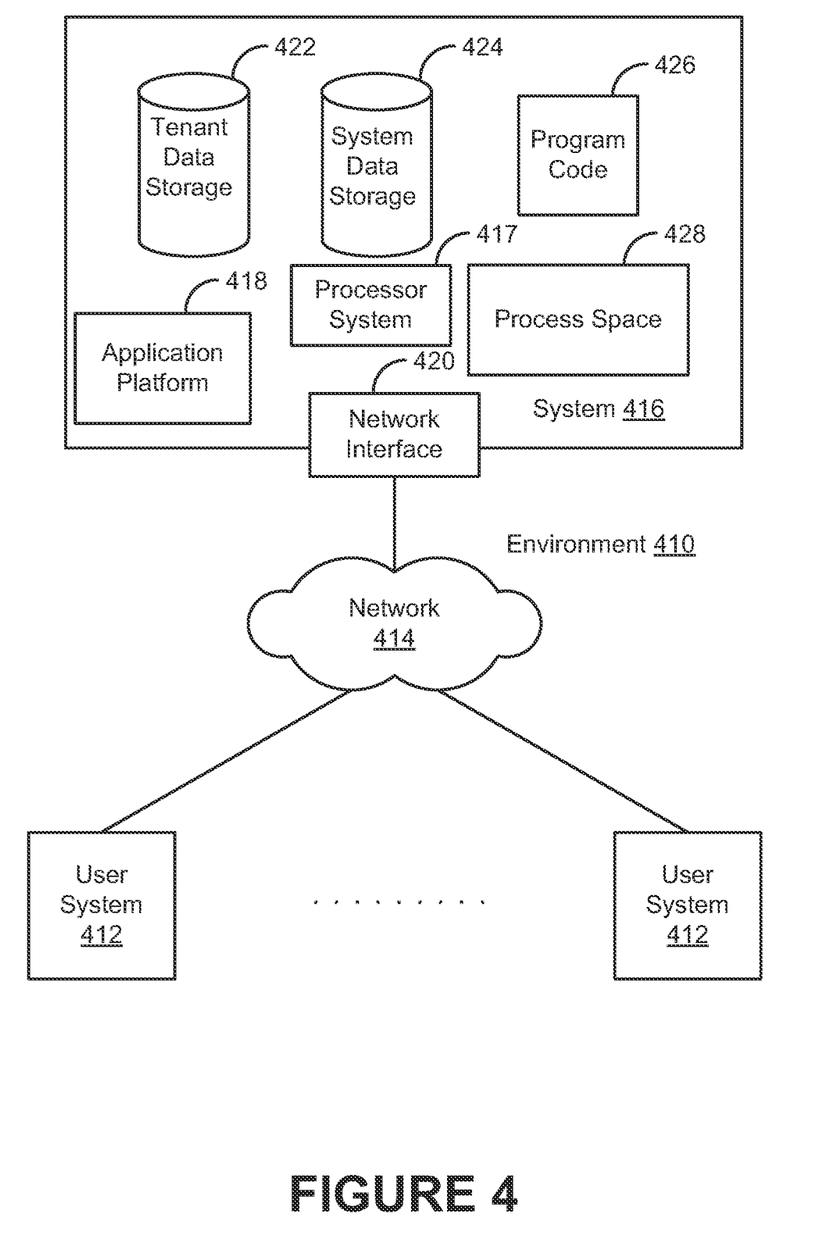
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a mufti-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GU( ) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, hut the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each NITS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
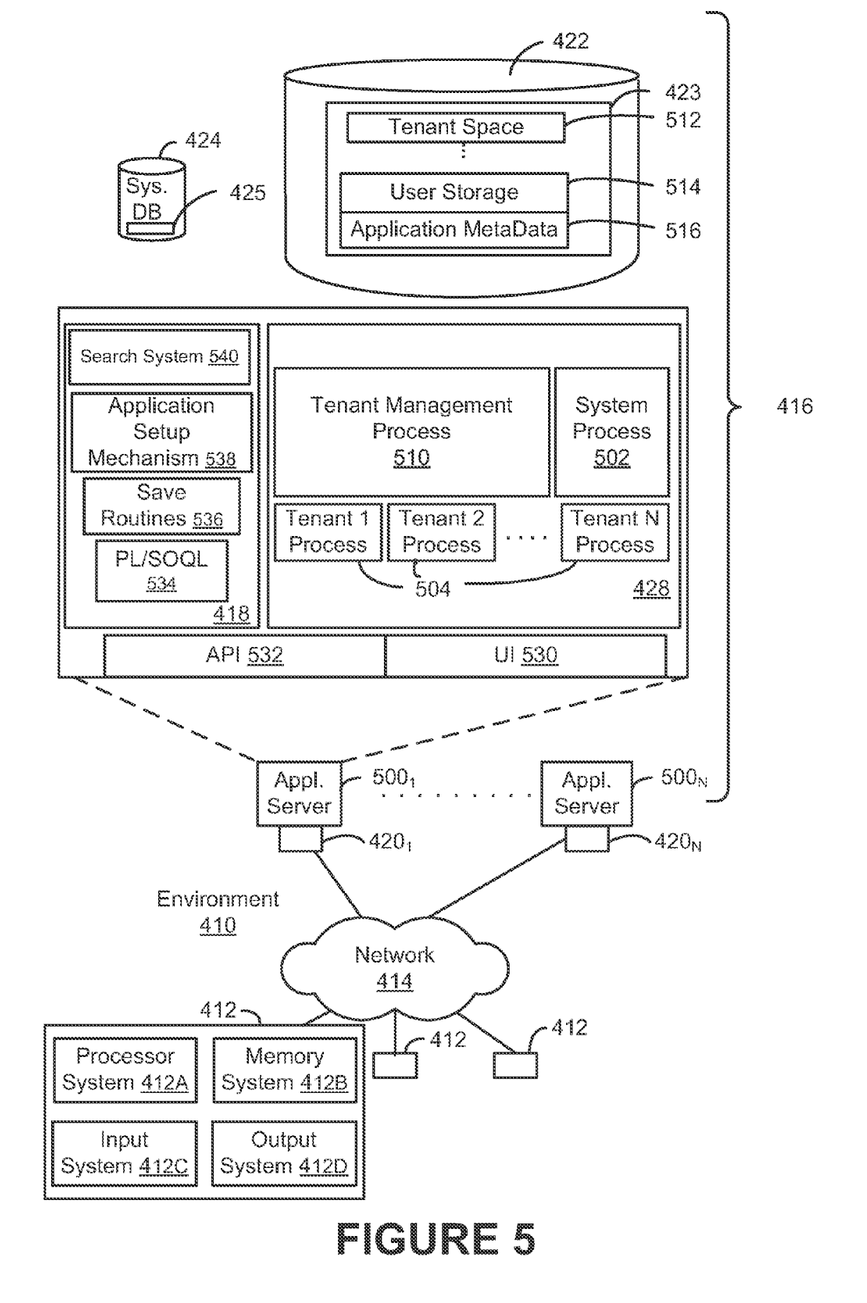
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL, 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackball's, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle® databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. As an option, the application platform 418 may further include a search system 440. Invocations to such applications may be coded using PL/SOQL 534 that provides a programming language style interface extension to API 532. A detailed description of some PL/SOQL language embodiments is discussed in commonly owned U.S. Pat. No. 7,730,478, entitled "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, hereby incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITIES AND FIELDS IN A MULTI-TENANT DATABASE SYSTEM", issued Aug. 27, 2010 to Craig Weissman, and hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed by a computer to implement a method, the method comprising:

receiving, by a first system providing a data feed as a service, a request to publish within the data feed to one or more users a link to content stored by a second system;

prior to publishing the link within the data feed, determining, by the first system, whether the content is at least potentially malicious, by applying at least one pre-defined rule to the link without retrieving the content from the second system;

when it is determined that the content is not at least potentially malicious, publishing the link within the data feed, by the first system, for allowing the one or more users to access the content from the second system via selection of the link within the data feed; and, when it is determined that the content is at least potentially malicious:

retrieving, by the first system, the content from the second system using the link, determining, by the first system, which portion of the retrieved content is at least potentially malicious, cleaning, by the first system, the portion determined to be at least potentially malicious, storing the cleaned content in memory of the first system, creating, by the first system, a new link to the stored cleaned content, and publishing within the data feed, by the first system, the new link to the stored cleaned content.

2. The computer program product of claim 1, wherein the request is received from a user via a user device separate from the second system storing the content and the first system providing the data feed as the service.

3. The computer program product of claim 1, wherein the request includes the link that references the content at the second system.

4. The computer program product of claim 1, wherein determining by the first system whether the content is at least potentially malicious is responsive to one of the users requesting access to the data feed for consumption of content published therein.

5. The computer program product of claim 1, wherein cleaning the portion of the content determined to be at least potentially malicious includes removing from the content the portion of the content determined to be at least potentially malicious.

6. The computer program product of claim 1, wherein cleaning the portion of the content determined to be at least potentially malicious includes changing an aspect of the portion of the content determined to be at least potentially malicious.

7. The computer program product of claim 1, wherein the first system stores the at least one predefined rule and executes code to apply the at least one predefined rule to the link without retrieving the content from the second system.

8. The computer program product of claim 1, wherein the second system is a third party server of a content provider separate from the first system providing the data feed as the service.

9. The computer program product of claim 8, wherein the first system providing the data feed as the service is a multi-tenant on-demand database system.

10. A method, comprising:
- receiving, by a first system providing a data feed as a service, a request to publish within the data feed to one or more users a link to content stored by a second system;
- prior to publishing the link within the data feed, determining, by the first system, whether the content is at least potentially malicious, by applying at least one predefined rule to the link without retrieving the content from the second system;
- when it is determined that the content is not at least potentially malicious, publishing the link within the data feed, by the first system, for allowing the one or more users to access the content from the second system via selection of the link within the data feed; and
- when it is determined that the content is at least potentially malicious:
  - retrieving, by the first system, the content from the second system using the link,
  - determining, by the first system, which portion of the retrieved content is at least potentially malicious,
  - cleaning, by the first system, the portion determined to be at least potentially malicious,
  - storing the cleaned content in memory of the first system,
  - creating, by the first system, a new link to the stored cleaned content, and
  - publishing within the data feed, by the first system, the new link to the stored cleaned content.

11. An apparatus, comprising:
- a first system providing a data feed as a service and having a processor for:
- receiving, by the first system providing the data feed as the service, a request to publish within the data feed to one or more users a link to content stored by a second system;
- prior to publishing the link within the data feed, determining, by the first system, whether the content is at least potentially malicious, by applying at least one predefined rule to the link without retrieving the content from the second system;
- when it is determined that the content is not at least potentially malicious, publishing the link within the data feed, by the first system, for allowing the one or more users to access the content from the second system via selection of the link within the data feed; and
- when it is determined that the content is at least potentially malicious:
  - retrieving, by the first system, the content from the second system using the link,
  - determining, by the first system, which portion of the retrieved content is at least potentially malicious,
  - cleaning, by the first system, the portion determined to be at least potentially malicious,
  - storing the cleaned content in memory of the first system,
  - creating, by the first system, a new link to the stored cleaned content, and
  - publishing within the data feed, by the first system, the new link to the stored cleaned content.

12. The system of claim 11, wherein the processor is coupled to memory via a bus.

* * * * *